United States Patent
Khavari (10) Patent No.: US 9,017,467 B2
(45) Date of Patent: Apr. 28, 2015

(54) SOLVENT-BASED INKJET INKS

(75) Inventor: Mehrgan Khavari, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/985,487

(22) PCT Filed: Mar. 7, 2011

(86) PCT No.: PCT/US2011/027394
§ 371 (c)(1),
(2), (4) Date: Aug. 14, 2013

(87) PCT Pub. No.: WO2012/121700
PCT Pub. Date: Sep. 13, 2012

(65) Prior Publication Data
US 2013/0327247 A1 Dec. 12, 2013

(51) Int. Cl.
*C09D 11/36* (2014.01)
*C09D 11/38* (2014.01)
*C09D 11/328* (2014.01)
*C08G 65/00* (2006.01)
*C09D 171/00* (2006.01)

(52) U.S. Cl.
CPC ............ *C09D 11/38* (2013.01); *C09D 11/328* (2013.01); *C09D 11/36* (2013.01); *C08G 65/007* (2013.01); *C09D 171/00* (2013.01); *C08G 2650/48* (2013.01)

(58) Field of Classification Search
CPC ..................................................... C09D 11/38
USPC ................................ 106/31.43, 31.59, 31.58
See application file for complete search history.

(56) References Cited

U.S. PATENT DOCUMENTS

| | | | | |
|---|---|---|---|---|
| 5,401,303 A * | 3/1995 | Stoffel et al. | | 106/31.43 |
| 5,919,293 A | 7/1999 | Moffatt et al. | | |
| 6,140,391 A | 10/2000 | Zou et al. | | |
| 6,436,180 B1 * | 8/2002 | Ma et al. | | 106/31.59 |
| 6,450,719 B1 | 9/2002 | Causton et al. | | |
| 6,726,756 B1 | 4/2004 | Zou et al. | | |
| 6,966,630 B2 | 11/2005 | Sasaki et al. | | |
| 7,081,158 B2 * | 7/2006 | Sabys et al. | | 106/31.58 |
| 7,434,913 B2 | 10/2008 | Suzuki et al. | | |
| 7,666,940 B2 * | 2/2010 | Iengo et al. | | 524/500 |
| 7,820,730 B2 | 10/2010 | Hahn et al. | | |
| 8,075,121 B2 * | 12/2011 | Barreto | | 347/95 |
| 2007/0120928 A1 * | 5/2007 | Ma et al. | | 106/31.59 |
| 2008/0178762 A1 | 7/2008 | Vasudevan | | |
| 2010/0302326 A1 * | 12/2010 | Morohoshi et al. | | 347/86 |

(Continued)

FOREIGN PATENT DOCUMENTS

| EP | 1138729 | 10/2001 |
|---|---|---|
| EP | 1533350 | 5/2005 |

(Continued)

OTHER PUBLICATIONS

English translation of JP 11/323228; Nov. 1999.*

(Continued)

*Primary Examiner* — Helene Klemanski
(74) *Attorney, Agent, or Firm* — Van Cott, Bagley, Cornwall & McCarthy (57) ABSTRACT

A solvent-based inkjet ink includes a soluble dye and approximately 0.1 to 1 wt % weight of the ink of a perfluoropolyether.

21 Claims, 4 Drawing Sheets

(56) References Cited

U.S. PATENT DOCUMENTS

| | | | |
|---|---|---|---|
| 2011/0012954 A1 | 1/2011 | Brown et al. | |
| 2014/0137766 A1* | 5/2014 | Chaffins et al. | 106/31.59 |

FOREIGN PATENT DOCUMENTS

| | | |
|---|---|---|
| JP | 11-323228 | 11/1999 |
| JP | 1999323228 | 11/1999 |
| JP | 2001214116 | 8/2001 |
| JP | 2006298948 | 11/2006 |
| JP | 2007099860 | 4/2007 |
| JP | 2009242723 | 10/2009 |
| JP | 2010-189490 | 9/2010 |
| TW | 201016797 | 5/2010 |
| WO | WO 2010042105 | 4/2010 |

OTHER PUBLICATIONS

English translation of JP 2010/189490; Sep. 2010.*
English translation of JP 2007/099860; Apr. 2007.*
English translation of JP 2009/242723; Oct. 2009.*
Extended European Search Report for Application No. PCT/US2011/027394 dated May 23, 2014 (6 pages).

* cited by examiner

SOLVENT-BASED INKJET INKS

BACKGROUND

Inkjet printing is a versatile method for recording images on various media surfaces for a number of reasons, including low cost, low printer noise, capability for high speed printing, and multicolor recording. Inkjet printing can deposit a variety of ink types including pigment based aqueous inks and dye based solvent inks. Dye based solvent inks can be particularly useful for ink jet printing on nonporous substrates.

An inkjet printing involves forcing very small ink droplets out of a nozzle with controlled timing, velocity, and direction. The ink droplets impact the substrate and the carrier fluid is absorbed or evaporates to leave the colorant on the surface of the substrate. This creates the desired image on the substrate. When the nozzle is not in use, evaporation of the carrier fluid from the nozzle can result in the accumulation of colorant in the nozzle. This can interfere with the proper ejection of the ink droplets from the nozzle. Additionally, it is desirable that the ink droplets maintain their shape when deposited on the substrate and do not puddle on the nozzle plate. Ink droplets which spread after deposition on the substrate can negatively impact the printing resolution. Ink puddling near the nozzles can disrupt droplet ejection or leave colorant residues.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

An inkjet printing involves forcing very small ink droplets out of a nozzle with controlled timing, velocity, and direction. The ink droplets impact the substrate and the carrier fluid is absorbed or evaporates to leave the colorant on the surface of the substrate. This creates the desired image on the substrate. When the nozzle is not in use, evaporation of the carrier fluid from the nozzle can result in the accumulation of colorant in the nozzle. This can interfere with the proper ejection of the ink droplets from the nozzle. Ultimately, too much residue in the nozzle could cause a plugged nozzle. Additionally, it is desirable that the ink droplets break cleanly from the nozzle and do not leave ink residue on the nozzle plate. Ink puddling near the nozzles can disrupt droplet ejection and degrade nozzle performance. Further, it is also desirable that the ink droplets that are deposited on the substrate do not spread too much as this can negatively impact the print quality.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1 wt % to about 20 wt % should be interpreted to include not only the explicitly recited concentration limits of 1 wt % to about 20 wt %, but also to include individual concentrations such as 2 wt %, 3 wt%, 4 wt %, and sub-ranges such as 5 wt % to 15 wt %, 10 wt % to 20 wt %, etc.

As used in the specification and appended claims the term "monohydric short chain alcohols" refers to ethanol and methanol. Percentages are given in weight percent where the term "wt %" is used.

Figure 1A:
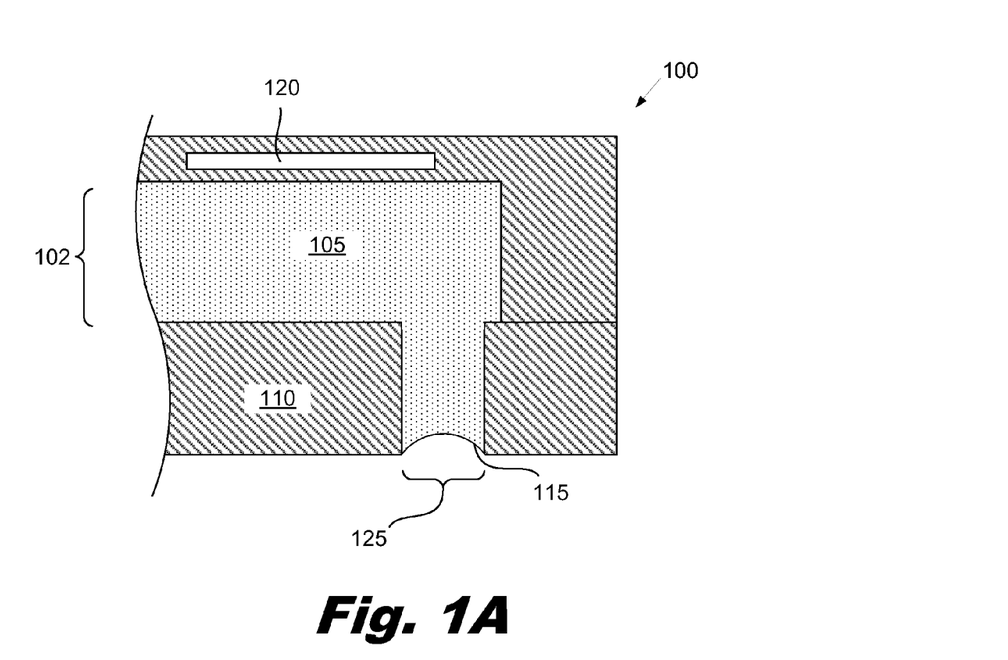
FIGS. 1A and 1B are cross-sectional diagrams of an illustrative thermal inkjet printhead, according to one example of principles described herein.

FIG. 1A is a cross-sectional diagram of a portion of a thermal inkjet printhead (100) which includes a firing chamber (102), heating element (120) and nozzle (125). The ink jet operates by sending a pulse of electrical current through the heating element (120). The generation of heat by the heating element (120) rapidly vaporizes a small portion of the ink (105) adjacent to the heating element (120). This forms a rapidly expanding bubble which forces a predetermined amount of ink (105) out of the nozzle (125). The heating element (120) rapidly cools after the electrical pulse and the bubble collapses, drawing additional ink (105) into the firing chamber (102).

Figure 1B:
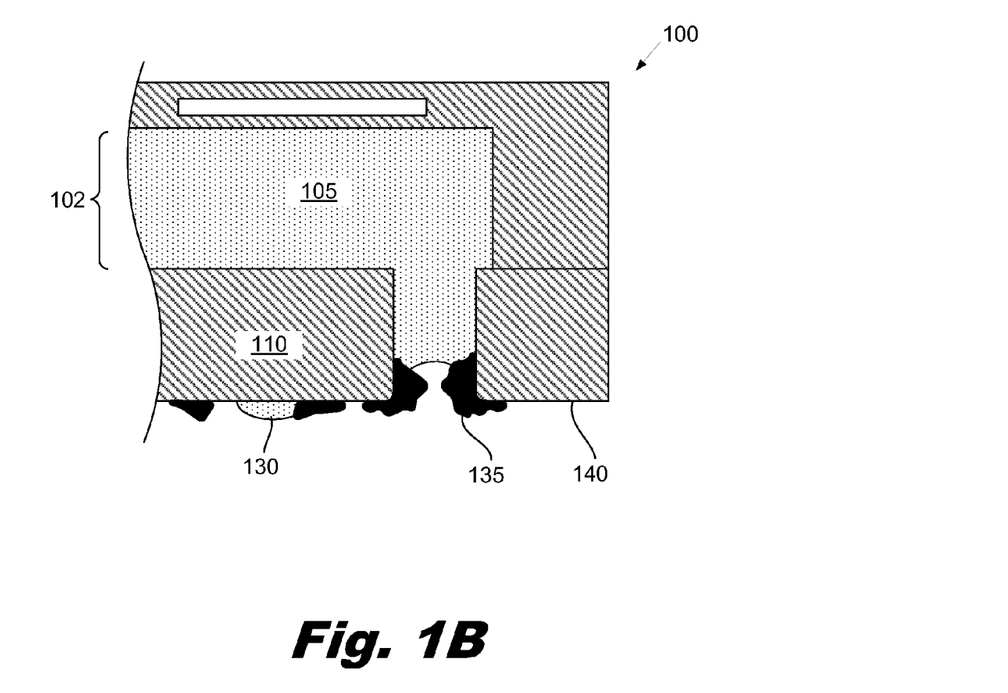

Significant periods of time can pass between firing events for a given nozzle (125). For example, the nozzle (125) may be exposed to the atmosphere for several minutes before either being fired or being covered. This exposure to the atmosphere can cause evaporation of solvent portions of the ink (105) through the nozzle (125). As the solvent evaporates, the ink colorants or other solids have a tendency to accumulate in and around the nozzle (125). FIG. 1B is a cross-sectional diagram of a portion of a thermal inkjet print head (100) which includes a nozzle (125) which has been partially blocked by the accumulation (135) of colorants. Over time, these accumulations (135) can dry out and block or alter the shape of the nozzle aperture. The amount of time which a nozzle (125) can remain uncovered and inactive without the nozzle being blocked or plugging is called "decap time," "nozzle decap" or simply "decap." If the nozzle (125) is blocked, subsequent firing of inkjet may not result in ink droplets being ejected. If the nozzle shape or size is altered, the ejected ink droplets may not be the desired size or have the desired trajectory. This can result in print defects which lower the quality of the image produced by the inkjet printer. Puddles (130) can also form on the orifice plate (110). These puddles (130) can also result in accumulations (135) which are unsightly and may interfere with the capping mechanism for the printhead (100).

Solvent inks, based on organic volatile compounds, are an ink family which presents a particular challenge with respect to nozzle decap. Solvent inks which have fast drying characteristics and compatibility with low or nonporous substrates are used in the industrial printing space. For example, solvent based inks are often used in a segment of the industrial printing called product coding. In this segment the finished or nearly finished packaged products receive a printed code for tracking purposes. These codes could be as simple as a text-based date and time stamp or as complicated as 1D or 2D barcodes. Special printers are designed for integration into a packaging line where the product receives its code. Packages run on a conveyer belt and the printer prints the desired code on the products as the packages move past the print station. The line speed and frequency of printing can vary depending on the nature of the job and the business needs. The advantage of solvent based inks becomes apparent when the print job needs fast dry times and the print-receivable packaging media (aka substrate) is non-porous or coated. Another segment of the printing industry that could use fast drying inks is mail printing and franking applications.

However, using fast evaporating inks in a thermal inkjet pen can result in evaporation of the solvent from the nozzle when the nozzle is not firing. Ink solids or colorants then accumulate in and around the nozzle. This can result in plugged nozzles and failure to jet ink. One method for reducing the effect of plugged nozzles is to use ink formulations with reduced colorant content. This reduction in dye content produces weak inks with an undesirably low optical density. Other methods include adding surfactants that alter the surface properties of the inks. For example, fluorosurfactants based on perfluorinated alkyl chains such as perfluorooctanoic acid (PFOA) or perfluorooctanesulfonic acid (PFOS) and number of derivatives or modifications, are added as an additive to help print definition on the media and reduce ink puddling. The presence of fluorosurfactant produces small improvements in nozzle decap. Additionally or alternatively, humectants could be added to the ink. The humectants absorb and retain solvents to prevent drying of the accumulations. However, humectants have a number of drawbacks, including slowing down the drying of the ink on the substrate and the reduction of dye content in the ink.

The challenges created by evaporation of ink through the nozzle can be particularly acute when the ink solvent is an organic volatile compound. The organic volatile compound is desirable for fast drying characteristics and compatibility with low or nonporous substrates. However, the same characteristics that make the volatile solvent fast drying on the substrate make the solvent quickly evaporate from the exposed nozzle. The challenge of creating an ink composition which quickly dries when deposited on a substrate but does not evaporate from the exposed nozzle is a long standing issue in the printing industry. Decreasing the volatility of the solvent decreases the evaporation from the nozzle and reduces the accumulation of ink solids in and around the nozzle. However, a less volatile solvent dries slower on the substrate, leading to slower printing, smearing, ink spreading, and other issues. Similarly, additives to the ink which reduce evaporation from the nozzle also increase the drying time of the ink.

The inventor has unexpectedly discovered that the addition of a modified perfluoropolyether (PFPE) dramatically improves decap performance of inkjets dispensing solvent based inks. In one example, the PFPE backbone has each end functionalized with alkyl amide groups. The modified PFPE also improves print definition on coated and non-porous media and has a positive effect on reducing ink puddling on the orifice plate of the inkjet printer.

Figure 2A:
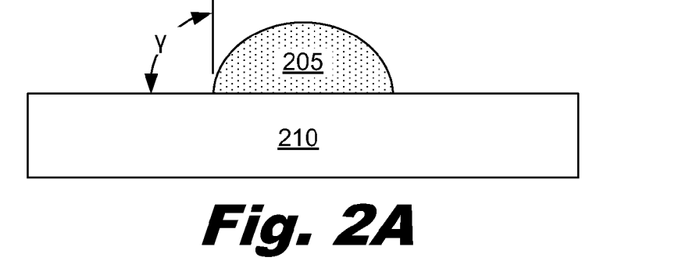
FIGS. 2A-2D are cross-sectional diagrams of ink deposited on substrates, according to one example of principles described herein.
Figure 2B:
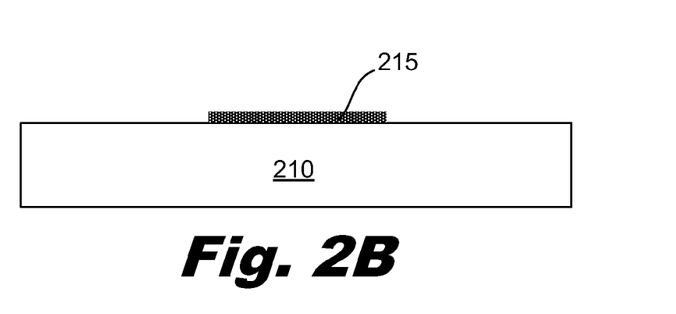

Droplet spreading on the substrate and puddling on the orifice plate are functions of the spread force of the ink on the media (or orifice plate) based on the difference in surface tension of the ink and surface energy of the substrate. FIGS. 2A-2D are cross-sectional diagrams of illustrative ink droplets (205, 225) deposited on a low or nonporous substrates (210). When an ink droplet is deposited on a low or nonporous substrate (210), it is desirable that solvent or carrier fluid evaporate relatively rapidly and leaves the colorants disposed on the upper surface of the substrate (210). When the ink droplet (205) contacts the substrate (210), the geometric behavior of the ink droplet (205) can depend on a number of factors including droplet velocity, the difference between the surface energy of the substrate (210) and the surface tension of the ink (205), and other factors. FIG. 2A shows an ink droplet (205) which has relative high surface tension deposited on the substrate (210). The contact angle $\gamma$ is the angle at which the liquid vapor interface meets the solid surface of the substrate (210). In this example, the contact angle $\gamma$ is approximately 90 degrees. Because the ink droplet (205) does not have a large affinity for the substrate (210), its surface tension tends to hold it in a compact hemispherical form. As the solvent evaporates, ink colorants (215) are deposited onto the substrate (210) in an area which corresponds to the droplet area, as shown in FIG. 2B.

Figure 2C:
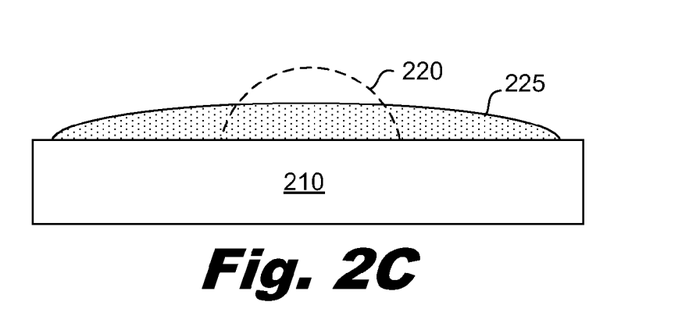
Figure 2D:
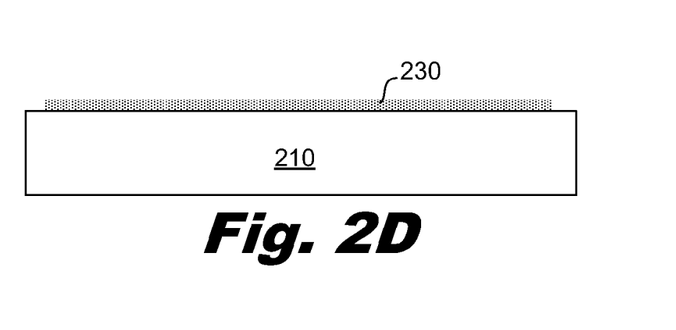

FIG. 2C shows a droplet with a high affinity for the substrate (210) which spreads from an initial position (220) which has a relatively hemispherical shape to a larger flatter shape (225). In ink jet printing, too much spreading of the ink droplets can lead to a loss of printing resolution and other print quality issues. FIG. 2D is a cross-sectional diagram of the ink pattern (230) which is deposed after the ink droplet (225) has dried. This ink pattern (230) is larger and has a lower optical density than the ink pattern (215, FIG. 2B) shown above. Inks containing high amounts of ethanol, in particular, have the tendency to spread when deposited on a substrate because of ethanol's low surface tension, 22 dynes/cm. The tendency of the spreading also influences the behavior of the ink on the orifice plate (110, FIG. 1A). Ink droplets with higher surface tensions tend not to adhere to the orifice plate (110, FIG. 1A) and thus do not leave solids behind on the orifice plate (110, FIG. 1A).

Faced with these challenges, the inventor has discovered a family of unique ink compositions which show dramatically decreased evaporation from the ink jet nozzles, but no substantial reduction in drying time of the ink on the substrate. This surprising result is achieved through the addition of low concentrations of modified perfluoropolyether in combination with suitable solvents. Other advantages of ink with modified perfluoropolyether include reduced spreading on coated and non-porous media and minimized ink puddling on the orifice plate. For example, ink with 0.1 to 1.0 wt% modified perfluoropolyether helps contain ethanol from spreading too much, thus improving print definition.

In one implementation, the modified perfluoropolyether may include a perfluoropolyether backbone with each end symmetrically functionalized with alkyl amide groups. One illustrative example of modified PFPE has a number-average molecular weight between 1200 and 2000 daltons and, its pure form, is an odorless light yellow wax. The structural formula for this example of modified perfluoropolyether is given by: $X-CF_2-(O-CF_2-CF_2)_n-(O-CF_2)_m-O-CF_2-X$ where $X=-CONH-C_{18}H_{37}$. In some implementations, the number-average molecular weight of the modified perfluoropolyether may range from 2100 to 2300 daltons. In some examples, shorter or longer PFPE chains ranging from 400 to 4000 number-average molecular weight and other alkyl amides ranging from C9 to C32 may produce similar improvements in decreasing evaporation from the ink jet nozzles with minimal reduction in drying time of the ink on the substrate. Specifically, the alkyl amide functional groups may range in size from —CONH—C9H19 to —CONH—C32H65.

Modified PFPE is commercially available in the Fluorolink family from Solvay-Solexis. For example, Fluorolink A10 or A10P (the pelletized version of A10), when combined with a specific range of solvent compositions, has been shown to dramatically improve the decap time of solvent inks, improve the print definition on coated and non-porous media, and to have a positive effect on reducing ink puddling on the orifice plate. Without modified PFPE, the solvent has the tendency to dry rapidly causing the ink to plug the nozzles. Presence of 0.1 to 1.0 wt % of modified PFPE substantially reduces nozzle plugging and extends the open time to longer than three minutes. Another indirect effect of PFPE is that, because the open nozzle time is now extended, more colorant could be used in the ink. This results in the deposition of a darker ink and printing with higher optical densities.

Modified PFPE with alkyl amide functional groups is soluble in acetone to a larger degree, but is not as soluble in water or alcohols such as ethanol or methanol. For example, perfluoropolyether modified with alkyl amide functional groups is soluble in methanol up to approximately 2000 parts per million and in ethanol up to 1000 parts per million. By solubilizing 0.1 to 1 wt % of modified PFPE into a solvent based ink, the improvements become apparent.

The table below describes a range of inks which were formulated with modified PFPE. The modified PFPE is effective in inks which include deionized water, methanol, ethanol, methyl acetate, ethyl acetate, and acetone. Methanol and ethanol can be used as single solvents or in combination with acetone depending on the application. A mixture of acetone and deionized water can also be used where the deionized water content is less than 15 wt % in relation to acetone 85 wt %. Testing showed that modified PFPE has very little or no effect on improving decap of inks composed mostly of longer chain alcohols like isopropyl and n-butyl. Also the addition of glycol ethers or glycol ether acetates has neither a positive nor a negative effect on solvent solution containing modified PFPE, and thus could be used as co-solvents in the ink formulation.

based inkjet ink. For example, the solvent dye may have a solubility of 1 wt % to 20 wt % in a particular solvent solution. The solvent dye may be a single dye or a combination of dyes. For example, a solvent green dye may be formed by mixing a solvent yellow dye and a solvent blue dye. The solvent composition can be selected to create the desired solubility for a particular solvent dye or combination of solvent dyes.

The lists of solvent dyes below describe the dyes using Color Index (C.I.) Generic Names. These lists are given only as examples and are not intended to be comprehensive. A number of other solvent dyes or solvent dye combinations could be used. Black solvent dyes may include C.I. Solvent Black 5, 7, 27, 28, 29, 34, 35, 45, 46, and 48. Blue solvent dyes may include C.I. Solvent Blue 4, 5, 6, 35, 38, 48, 59, 67, 70, 104, and 136. Violet solvent dyes may include C.I. Solvent Violet 8, 9, 11, 14, and 38. Brown solvent dyes may include C.I. Solvent Brown 1, 3, 5, 20, 42, 43, 44, 48 and 52. Orange solvent dyes may include C.I. Solvent Orange 3, 11, 20, 25, 54, 60, 62, 63, 86, 99, and 105. Red solvent dyes may include C.I. Solvent Red 1, 23, 29, 49, 119, 122, 125, 127, 130, 132, 135, 149, 160, 164, 168, 169, 172 and 233. Yellow solvent dyes may include C.I. Solvent Yellow 10, 13, 14, 19, 25, 28, 33, 88, 89, 114, 146 and 163. As discussed above, solvent dyes may be used in a wide variety of combinations. For example, C.I. Solvent Blue 70 and C.I. Red 233 or Solvent Violet 9 and Solvent Brown 52 can be used in combination.

The seven ink families described above are formulations of inks which improved decap times over similar solvent inks which do not contain modified PFPE. The first ink family ("Ink A") describes acetone:ethanol solvent combinations. The second ink family ("Ink B") describes acetone:methanol solvent combinations. The third ink family ("Ink C") is a subset of the first ink family ("Ink A") which contains 1 to 10 wt % of acetone and correspondingly larger amounts of ethanol. For example, both the first and third ink families include an ink which contain 5 wt % acetone, 0.1 to 1 wt % modified PFPE, 7.5% dye, and ethanol.

The fourth ink family ("Ink D") can include up to 10% acetone but does not necessarily include acetone. This ink family includes an ink in which ethanol is used as the primary solvent without substantial amounts of acetone. As discussed above, up to 1000 parts per million (0.1 wt %) of PFPE is soluble in ethanol. Test results for this and other inks are shown below in FIG. 4.

TABLE 1

| Components in weight percent of finished ink | | | | | | | |
| --- | --- | --- | --- | --- | --- | --- | --- |
| Components | Ink A | Ink B | Ink C | Ink D | Ink E | Ink F | Ink G |
| PFPE | 0.1-1 | 0.1-1 | 0.1-1 | 0.2-1 | 0.1-1 | 0.1-1 | 0.1-1 |
| Acetone | 1-80 | 1-80 | 1-10 | up to 10% | 5-80% | 5-80% | 82-90 |
| Dye | 3-7.5 | 3-7.5 | 3-7.5 | up to 10% | up to 10% | up to 10% | up to 10% |
| Ethanol | Balance | 0 | Balance | Balance | Balance | 0 | 0 |
| Methanol | 0 | Balance | 0 | 0 | 0 | Balance | 0 |
| DI Water | 0 | 0 | 0 | 0 | 0 | 0 | 3-10% |
| Additive 1 | 0 | 0 | 0 | 0 | 10-20% | 10-20% | 0-15% |
| Total | 100 | 100 | 100 | 100 | 100 | 100 | 100 |

In the examples given above, "Additive 1" is 1-methoxy-2-propanol. In addition to the components explicitly recited above, a variety of other components could be added to the ink formulations. For example, approximately 1 to 8 wt % diethylene glycol butyl ether can be added to any of the ink formulations described above.

As used in the specification and appended claims, the term "solvent dye" refers to any dye which is soluble in solvent The fifth and sixth ink families ("Ink E" and "Ink F") describe formulations which are similar to Ink A and Ink B, but further include 10 to 20 wt % of 1-methoxy-2-propanol. For example, the fifth ink family ("Ink E") includes the ink combinations with ethanol: acetone: 1-methoxy-2-propanol ratios of: 60:20:20; 20:60:20; 60:30:10; 45:45:10; 10:80:10; 85:05:10; and 80:05:15. Similarly, the sixth ink family ("Ink F") includes the ink combinations with methanol: acetone:

1-methoxy-2-propanol ratios of: 60:20:20; 20:60:20; 60:30: 10; 45:45:10; 10:80:10; 85:05:10; and 80:05:15.

Figure 3A:
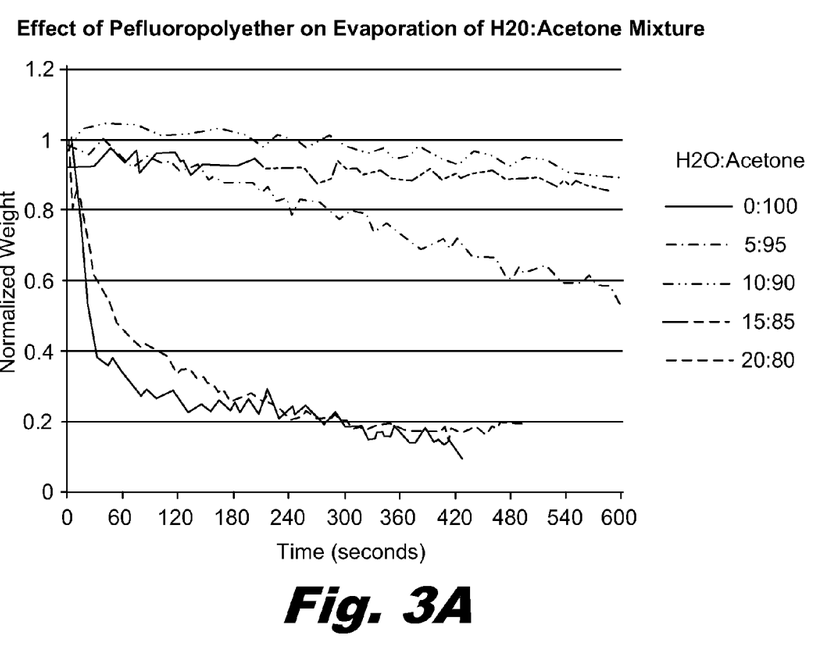
FIGS. 3A and 3B are graphs of evaporation rates of water acetone mixtures containing perfluoropolyether (PFPE), according to one example of principles described herein.
Figure 3B:
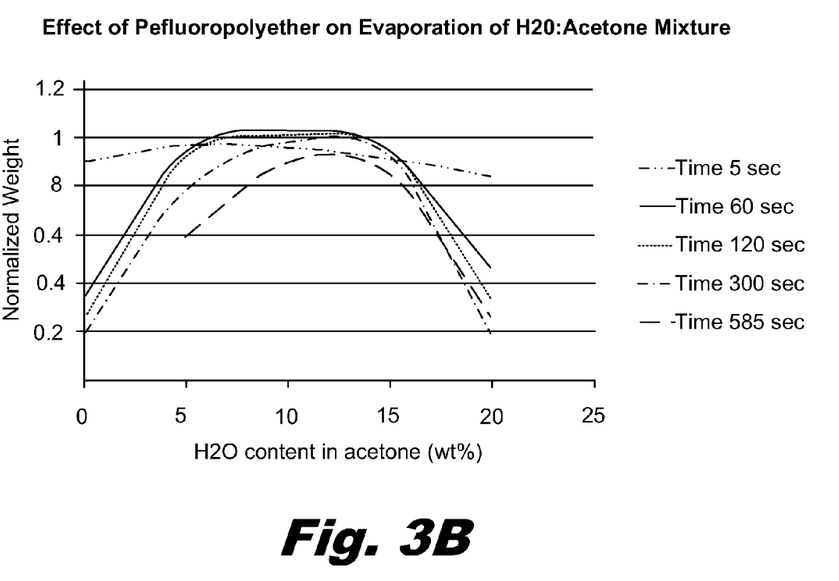

The seventh ink family ("Ink G") describes a number of inks which contain a combination of acetone and deionzed (DI) water. Test results for this ink family and other inks are shown in FIG. 3A and 3B. This ink family includes ink combinations with DI water: acetone: 1-methoxy-2-propanol ratios of: 10:80:10; 10:90:0; 05:80:15; 05:85:10; 03:82:15; and 03:87:10.

Thus, an illustrative solvent-based inkjet ink includes a solvent dye and approximately 0.1 wt % to 1 wt % weight of the ink of a perfluoropolyether. In some examples, the perfluoropolyether is functionalized and has a number-average molecular weight of between 400 to 4000 daltons. The functionalized perfluoropolyether may contain at least one an alkyl amide functional group. In some implementations, the functionalized perfluoropolyether is symmetrically functionalized. The alkyl amide functional group may have a variety of structures including —CONH—$(CH_2)_x$-$CH_3$ where x=8 to 32. In a specific example, the functionalized perfluoropolyether has an alkyl amide functional group of —CONH—$(CH_2)_{17}$-$CH_3$. This functionalized perfluoropolyether may have a number-average molecular weight between 2100 and 2300 daltons.

The ink may also include a variety of solvent solutions. The solvent solutions may include at least one of: monohydric short chain alcohols, acetone, ethyl acetate, methyl acetate, 1-methoxy-2-propanol, and diethylene glycol butyl ether. Where monohydric short chain alcohol is included, the monohydric short chain alcohol is at least one of: ethanol, methanol and ethanol/methanol mixtures. In one implementation, the solvent solution includes approximately 10 to 20 wt % of 1-methoxy-2-propanol, 10 to 85 wt % monohydric short chain alcohol, and 5 to 80 wt % acetone.

One illustrative solvent based inkjet ink includes up to 10 wt % of acetone, up to 10 wt % of a dye, and 0.2 to 1.0 wt % of functionalized perfluoropolyether. The acetone in this or other examples may be partially or fully substituted with ethyl acetate or methyl acetate. Another illustrative solvent based inkjet ink includes a solvent comprising up to 10 wt % of acetone, up to 10 wt % of a soluble dye, and approximately 0.2 wt % to 1 wt % of the ink of a functionalized perfluoropolyether.

As discussed above, the functionalized perfluoropolyether may include alkyl amide functional group of —CONH—$(CH_{2)17}$-$CH_3$, the functionalized perfluoropolyether having a number-average molecular weight between 2100 and 2300 daltons. In another implementation, the solvent based ink includes 5 to 80 wt % of acetone, 10 to 20 wt % of 1-methoxy-2-propanol, 10 to 85 wt % monohydric short chain alcohol, 1 to 10 wt % of a soluble dye, up to 20 wt % of de-ionized water; and approximately 0.2 wt % to 1 wt % weight of the ink of a functionalized perfluoropolyether. As discussed above, the functionalized perfluoropolyether may have a variety of functional groups and molecular weights.

The ink families and formulations described above are not exhaustive. A variety of other solvent ink formulations could be used which implement the principles described herein and achieve improved decap times.

Figure 4:
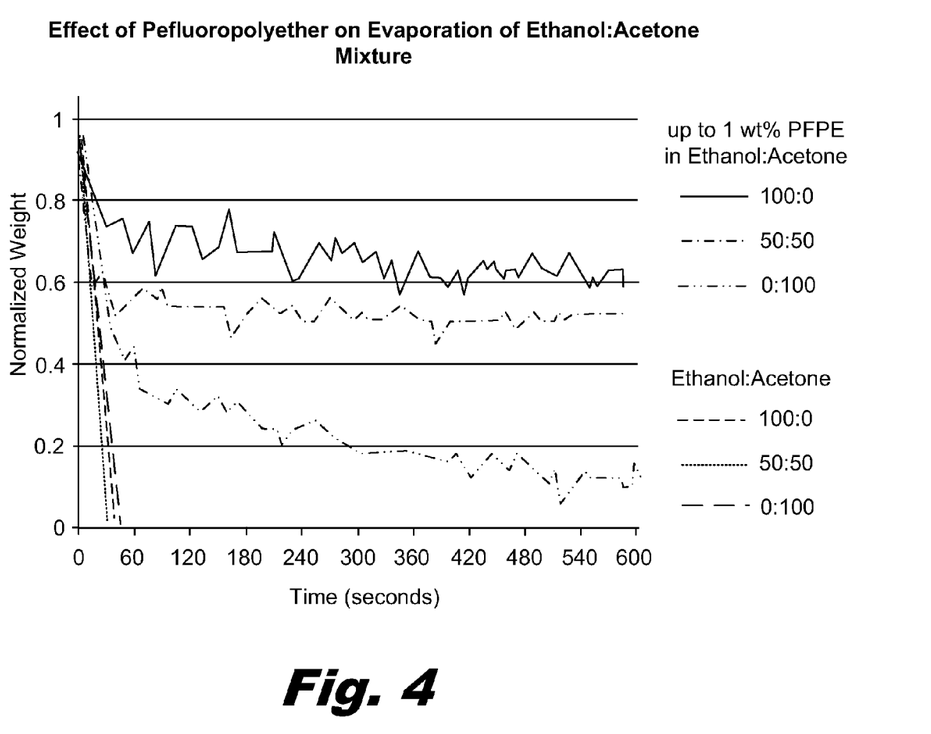
FIG. 4 is a graph of evaporation rates of ethanol acetone mixtures which contain PFPE, according one example of principles described herein.

FIGS. 3A, 3B, and 4 show test results from a variety of ink compositions and control solutions. FIGS. 3A and 3B are graphs of evaporation rates of water/acetone mixtures containing modified PFPE. The results shown in FIGS. 3A and 3B are generated from tests to determine how much ink solvent evaporated over a given period of time. These tests measure the efficacy of various ink formulations in extending the decap time of the inkjet print head. In FIG. 3A, the horizontal axis measures time in seconds, from a start time on the left to 600 seconds on the right. The vertical axis measures the normalized weight of an ink droplet over the period of time. All ink formulations contained up to 1 wt % of modified PFPE. The ink droplets had a starting weight of 5-8 milligrams. The ink composition which included approximately 10 wt % deionized (DI) water and 90 wt % acetone (shown by the dash-dot-dot curve) showed the smallest weight loss of all the ink compositions shown in the graph. The small weight loss corresponds to low evaporation rates and longer decap times. For this composition, the droplet maintained approximately 90% of its original mass over a period 600 seconds.

The ink composition which included approximately 15 wt % deionized water and 85% acetone showed similar performance, with approximately 85% of its original mass being maintained at the end of the 600 second tests. However, the ink composition which included 5 wt % of water and 95 wt % of acetone did not perform as well, with 50% of the original mass remaining at the end of the test. The last two compositions showed significant weight loss in the first 60 seconds of the test and then continued to lose weight during the rest of the test. The data shows that at approximately 300 seconds both of these formulations had less than 20% of their original mass remaining. These fast evaporations times could be correlated to shorter decap times for these ink formulations.

FIG. 3B shows the data obtained in the test described above graphed in a different way. In this graph, the weight percent of $H_2O$ content in the ink composition is graphed on the horizontal axis of the chart and the normalized weight as a function of time is graphed along the vertical axis of the chart. This graph shows that water acetone solutions with between 5 wt % and 15 wt % water and up to 1 wt % of modified PFPE have very little evaporation. For example, water acetone solutions with between 5 wt % and 15 wt % water maintain nearly all of their original mass over time periods of 5, 60, 120 seconds and show only slight evaporation losses at 300 and 585 seconds.

FIG. 4 is a graph of evaporation rates of ethanol acetone mixtures which contain PFPE. The horizontal axis of the graph shows the time in seconds, with the test start time on the left and the end of test at 600 seconds on the right. Normalized weight of the ink droplets is shown on the vertical axis. Two different groups of solutions are illustrated on the chart. A first group contains three solutions of ethanol and acetone which contain up to 1 wt % of modified PFPE. A second group contains three control solutions of ethanol and acetone which do not contain modified PFPE. The starting mass of the droplets was between 5-7 milligrams.

As shown in the graph, the first group of solutions shows a significant reduction in weight loss when compared to the second group of control solutions. The three control solutions in the second group include: 100 wt % ethanol; 50 wt % ethanol: 50 wt % acetone; and 100 wt % acetone. The three control solutions showed very rapid evaporation with the entire drop evaporating before 60 seconds. In contrast, the first group of solutions, which contained modified PFPE showed a substantially reduced level of evaporation. The solution with approximately 100 wt % acetone and up to 1% wt PFPE showed the best performance in this group of solutions. This solution showed some early evaporation during the first 60 seconds, but stabilized at greater than 60% of the original droplet weight over the remained of the test period. Similarly, the 50 wt % ethanol: 50 wt % acetone solution which included PFPE also showed a higher rate of evaporation early in the test period, but later stabilized at approximately 50% of the original mass of the droplet. The 100 wt % acetone with PFPE did not perform nearly as well, with a sharp drop early in the test and continued evaporation until the end of the test. This solution ended the test with approximately 10 to 15% of its original mass.

In conclusion, the principles and formulations described above demonstrate the efficacy of modified PFPE in extending decap time of solvent based inks. The PFPE significantly extends the decap time of ink solutions which include monohydric short chain alcohols. Combinations of acetone, which has a relatively high solubility of PFPE, can also be effective when combined with deionized water or monohydric short chain alcohols. Further, because the decap time is extended, more colorant can be used in the ink. This results in darker inks and higher optical densities on low or non porous substrates. Additionally, the addition of modified PFPE helps prevent spreading of inks which contain ethanol. This improves print definition.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A solvent-based inkjet ink, comprising:
    a solvent dye;
    a solvent;
    a co-solvent that is different than the solvent, the co-solvent being selected from the group consisting of methyl acetate, ethyl acetate, and deionized water; and
    a perfluoropolyether present in an amount ranging from about 0.1 wt% to about 1 wt% of a weight of the ink.
2. The ink of claim 1, in which the perfluoropolyether comprises a functionalized perfluoropolyether.
3. The ink of claim 2, in which a number-average molecular weight of the functionalized perfluoropolyether is between 400 daltons and 4000 daltons.
4. The ink of claim 2, in which the functionalized perfluoropolyether contains at least one alkyl amide functional group.
5. The ink of claim 4, in which the alkyl amide functional group has the structure —CONH—$(CH_2)_x$—$CH_3$ wherein x=8 to 31.
6. The ink of claim 2, in which the functionalized perfluoropolyether comprises the alkyl amide functional group of —CONH—$(CH_2)_{17}$—$CH_3$, the functionalized perfluoropolyether having a number-average molecular weight between 2100 daltons and 2300 daltons.
7. The ink of claim 1, wherein the solvent is selected from the group consisting of monohydric short chain alcohols, acetone, ethyl acetate, methyl acetate, 1-methoxy-2-propanol, de-ionized water, and diethylene glycol butyl ether.
8. The ink of claim 7, in which the monohydric short chain alcohol comprises at least one of: ethanol, methanol and ethanol/methanol mixtures.
9. The ink of claim 1, wherein:
    the solvent is acetone and ethanol, and wherein the acetone is present in an amount ranging from greater than 0 wt % to about 10 wt % of the weight of the ink and the ethanol makes up a balance of the weight of the ink;
    the solvent dye is present in an amount ranging from greater than 0 wt % to about 10 wt % of the weight of the ink; and
    the perfluoropolyether is a functionalized perfluoropolyether, and the functionalized perfluoropolyether is present in an amount ranging from about 0.2 wt % to about 1.0 wt % of the weight of the ink.
10. The ink of claim 9 wherein:
    the acetone is present in an amount ranging from about 2 wt % to about 10 wt %; and
    the solvent dye is present in an amount ranging from about 0.5 wt % to about 10 Wt %.
11. The ink of claim 1 wherein the co-solvent is water present in an amount ranging from greater than 0 wt % to about 20 wt % of the weight of the ink.
12. A solvent-based inkjet ink, comprising:
    a solvent dye;
    a perfluoropolyether in an amount ranging from about 0.1 wt% to about 1 wt% of the weight of the ink; and
    a solvent including 1-methoxy-2-propanol in an amount ranging from about 7 wt % to about 20 wt % of the weight of the ink, a monohydric short chain alcohol present in an amount ranging from about 10 wt % to about 85 wt % of the weight of the ink, and acetone present in an amount ranging from about 5 wt % to about 80 wt % of the weight of the ink.
13. A solvent-based inkjet ink, comprising:
    a solvent dye;
    a perfluoropolyether in an amount ranging from about 0.1 wt % to about 1 wt % of a weight of the ink; and
    a solvent including diethylene glycol butyl ether in an amount ranging from about 1 wt % to about 8 wt % of the weight of the ink.
14. A solvent-based inkjet ink, comprising:
    a solvent dye present in an amount greater than 0 wt % and up to 10 wt % of a weight of the ink;
    a functionalized perfluoropolyether present in an amount ranging from 0.2 wt % to 1.0 wt % of the weight of the ink;
    acetone present in an amount ranging from greater than 0 wt % up to 10 wt % of the weight of the ink;
    and wherein the acetone has been at least partially substituted by at least one of: ethyl acetate and methyl acetate.
15. The ink of claim 14 wherein:
    the acetone is present in an amount ranging from about 2 wt % to about 10 wt %; and
    the solvent dye is present in an amount ranging from about 0.5wt % to about 10 wt%.
16. A solvent-based inkjet ink, comprising:
    a solvent dye;
    a perfluoropolyether in an amount ranging from about 0.1 wt % to about 1 wt % of a weight of the ink;
    deionized water present in an amount ranging from about 3 wt % to about 10 wt % of the weight of the ink;
    acetone present in an amount ranging from about 82 wt % to about 90 wt% of the weight of the ink; and
    1-methoxy-2-propanol present in an amount ranging from greater than 0 wt % to about 15 wt %.
17. The ink of claim 16 wherein the 1-methoxy-2-propanol is present in an amount ranging from 0.1wt % to about 15 wt %.
18. A solvent-based inkjet ink, comprising:
    a solvent comprising from greater than 0 wt % to about 80 wt % of a weight of the ink of acetone;
    from greater than 0 wt % to about 10 wt % of the weight of the ink of a soluble solvent dye; and
    from about 0.2 wt % to about 1 wt % of the weight of the ink of a functionalized perfluoropolyether comprising alkyl amide functional group of —CONH—$(CH_2)_{17}$—$CH_3$, the functionalized perfluoropolyether having a number-average molecular weight between 2100 daltons and 2300 daltons.
19. The ink of claim 18, further comprising a monohydric short chain alcohol selected from the group consisting of ethanol and methanol.

20. The ink of claim 18 wherein:
the acetone is present in an amount ranging from about 2 wt % to about 10 wt %; and
the soluble solvent dye is present in an amount ranging from about 0.5 wt% to about 10 wt %.

21. A solvent-based inkjet ink, comprising:
from about 5 wt % to about 80 wt % of a weight of the ink of acetone;
from about 10 wt % to about 20 wt % of the weight of the ink of 1-methoxy-2-propanol;
from about 10 wt % to about 85 wt % of the weight of the ink a monohydric short chain alcohol;
from about 1 wt % to about 10 wt % of the weight of the ink of a soluble solvent dye;
from greater than 0 wt % to about 20 wt % of the weight of the ink of de-ionized water; and
from about 0.2 wt % to about 1 wt % of the weight of the ink of a functionalized perfluoropolyether comprising alkyl amide functional group of —CONH—$(CH_2)_{17}$—$CH_3$, the functionalized perfluoropolyether having a number-average molecular weight between 2100 daltons and 2300 daltons.

* * * * *